(12) United States Patent
Kubo et al.

(10) Patent No.: US 7,298,789 B2
(45) Date of Patent: Nov. 20, 2007

(54) POLARIZATION MODULATION WITH AMPLITUDE DIFFERENTIAL

(75) Inventors: Hiroaki Kubo, Ohmihachiman (JP); Norio Fujita, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 10/773,361

(22) Filed: Feb. 6, 2004

(65) Prior Publication Data
US 2004/0184556 A1    Sep. 23, 2004

(30) Foreign Application Priority Data
Mar. 7, 2003    (JP)    ............... 2003-062215

(51) Int. Cl.
*H04L 27/10* (2006.01)
(52) U.S. Cl. .................................... 375/279
(58) Field of Classification Search ............ 375/200, 375/267, 299, 265, 347, 349, 260, 257, 279; 370/204, 335
See application file for complete search history.

(56) References Cited

U.S. PATENT DOCUMENTS

| | | | |
|---|---|---|---|
| 6,317,411 B1* | 11/2001 | Whinnett et al. | 370/204 |
| 6,466,610 B1* | 10/2002 | Schilling | 375/141 |
| 7,133,459 B2* | 11/2006 | Onggosanusi et al. | 375/267 |
| 2002/0090035 A1* | 7/2002 | Seshadri et al. | 375/265 |
| 2004/0146014 A1* | 7/2004 | Hammons et al. | 370/320 |
| 2005/0201481 A1* | 9/2005 | Calderbank et al. | 375/265 |

* cited by examiner

*Primary Examiner*—Emmanuel Bayard
(74) *Attorney, Agent, or Firm*—David R. Irvin

(57) ABSTRACT

Wireless data communication method and apparatus using two electromagnetic signals having different polarizations. Codes related to relative values of the amplitudes of the two signals are generated in correspondence with data to be transmitted. The signals are modulated according to the codes using phase shift keying and amplitude shift keying. The amplitude shift keying modulates the two electromagnetic signals by changing the difference between their two amplitudes in accordance with data encodings. The two signals are transmitted to receiver, which decodes the phases and relative amplitudes to obtain the codes, and reproduces the data from the obtained codes.

7 Claims, 5 Drawing Sheets

POLARIZATION MODULATION WITH AMPLITUDE DIFFERENTIAL

FIELD OF THE INVENTION

The present invention relates to a method, apparatus, and system for transmitting information by modulating a carrier wave or receiving information in a modulated carrier wave in wireless communication.

BACKGROUND

Various schemes for communicating information by modulating a carrier exist. Typical examples of such schemes are frequency shift keying (FSK), phase shift keying (PSK), and amplitude shift keying (ASK).

In phase shift keying, phases (0, pi) of a carrier are transmitted in correspondence with input data (0 or 1). Given two phases, one data bit may be transmitted per phase shift. With other phase shift keying schemes, more than one bit per shift may be transmitted. For example, in quadrature phase shift keying (QPSK), two bits successively input are regarded as one symbol, and phases (pi/4, 3pi/4, 5pi/4, 7pi/4) of a corresponding carrier are transmitted.

A quadrature phase shift keying hierarchy in which important data and unimportant data are differentiated from each other is disclosed in Published Unexamined Japanese Patent Application No. 5-276211.

In amplitude shift keying, the amplitude A of a carrier is modulated to carry, for example, two values (A/2, A) in correspondence with input data (0 or 1). The carrier modulated by amplitude shift keying is received by a receiver. The amplitude level of the received carrier is detected, and the input data corresponding to the detected amplitude level is reproduced. In this simple example, 1 is obtained as the input data when the amplitude level of the received wave is A, and 0 is obtained when the amplitude level is A/2. In this kind of amplitude shift keying, the rate of data transmission may be increased by increasing the number of different amplitude levels, i.e., increasing the number by which the amplitude A is divided.

Amplitude shift keying in wireless communication, however, can be easily affected by propagation path disturbances such as disturbances due to weather conditions such as rain or clouds. Fading may occur such that the received wave amplitude fluctuates in a short cycle. The amplitude of the carrier consequently fluctuates unpredictably, and the bit error rate thereby increases. In the above-described example, if a carrier with amplitude A, which for example corresponds to input data 1, undergoes a disturbance that results in the amplitude being halved to A/2, incorrect input data 0 is reproduced. For this reason, phase shift keying, which is advantageous in terms of noise resistance, is frequently used instead of amplitude shift keying.

On the other hand, cable broadcasting such as CATV is free from the above-described attenuation problem, and amplitude shift keying is effective in this environment. For cable broadcasting, therefore, keying schemes that combine amplitude shift keying and phase shift keying are being used. Such a keying scheme has been introduced, for example, in Published Unexamined Japanese Patent Application No. 63-175542.

For example, binary phase shift keying and binary amplitude shift keying may be performed on each of two polarized carrier waves, in this case horizontally and vertically polarized waves that are orthogonal to each other. In this case, the phase shift keying and amplitude shift keying together enable transmission of 2×2=4 bits of data per polarization. Accordingly, 4×4=16 bits of data per baud can be transmitted on the entire carrier. Since phase shift keying is combined with amplitude shift keying, the amplitude of each polarized wave is determined by the amplitude of the envelope of the polarized wave.

As described above, if amplitude shift keying and phase shift keying are performed in combination on each of two independently polarized waves, a multiplicity of information bits can be transmitted in one frequency band. However, this keying scheme is not effective in wireless communication, because the above-described attenuation of carrier amplitude by propagation-path disturbances cannot be avoided. That is, the influence of a disturbance may fluctuate with time, thereby causing the absolute value of the amplitude of the received carrier also to fluctuate with time, resulting in failure to reliably reproduce transmitted data.

Therefore, an object of the present invention is to provide a wireless communication method which extends digital transmission capabilities so that amplitude shift keying may be applied to two differently polarized waves without suffering the problem of excessive error rates caused by propagation-path disturbances acting on carrier signal amplitudes.

SUMMARY

A communication method in accordance with the present invention may include a step of generating, in correspondence with data to be transmitted, codes related to relative values of the amplitude intensities of a first polarized wave and a second polarized wave independent of the first polarized wave, a step of transmitting the first and second polarized waves by modulating the first and second polarized waves according to the codes, a step of receiving the transmitted first and second polarized waves and detecting the amplitude intensities of the first and second polarized waves, a step of obtaining the codes by decoding from the detected amplitude intensities, and a step of reproducing the transmitted data from the obtained codes.

A high degree of independence can be maintained between the first and second polarized waves even during wireless transmission. Consequently, data carried by modulation is also independent between the two polarized waves, and the first and second polarized waves are therefore capable of sustaining high data throughput in a single frequency band.

The relative values of the amplitude intensities of the first and second polarized waves are not substantially affected by attenuation due to propagation path disturbances. Therefore, the transmitted data can be reproduced with improved accuracy by demodulation by using the codes related to the relative values.

A communication apparatus in accordance with the present invention may include a transmitter which transmits a first and a second polarized wave independent of the first polarized wave, a code data assigner which assigns codes corresponding to the data to be transmitted and related to the relative values of the amplitude intensities of the first and second polarized waves to be transmitted, and a modulator which modulates the first and second polarized waves to the amplitudes corresponding to the codes assigned by the code data assigner.

Another communication apparatus in accordance with the present invention may include a receiver which receives a first polarized wave and a second polarized wave, a relative amplitude detector which detects relative values of the amplitude intensities of the first and second polarized waves received by the first and second receivers, a decoding section which decodes to obtain the codes from the relative values detected by the relative amplitude detector, and a reproduction section which reproduces the transmitted data from the codes decoded by the decoding section.

The above-described communication method may be carried out by using this communication apparatus. Also, a wireless communication system may be constructed by using a plurality of the above-described communication apparatus.

In the description that follows, the first polarized wave may be referred to as the "horizontally polarized wave" and the second polarized wave may be referred to as the "vertically polarized wave."

BRIEF DESCRIPTION OF THE DRAWINGS

The invention will now be explained in further detail with reference to the attached drawings, wherein.

DETAILED DESCRIPTION

Figure 3:
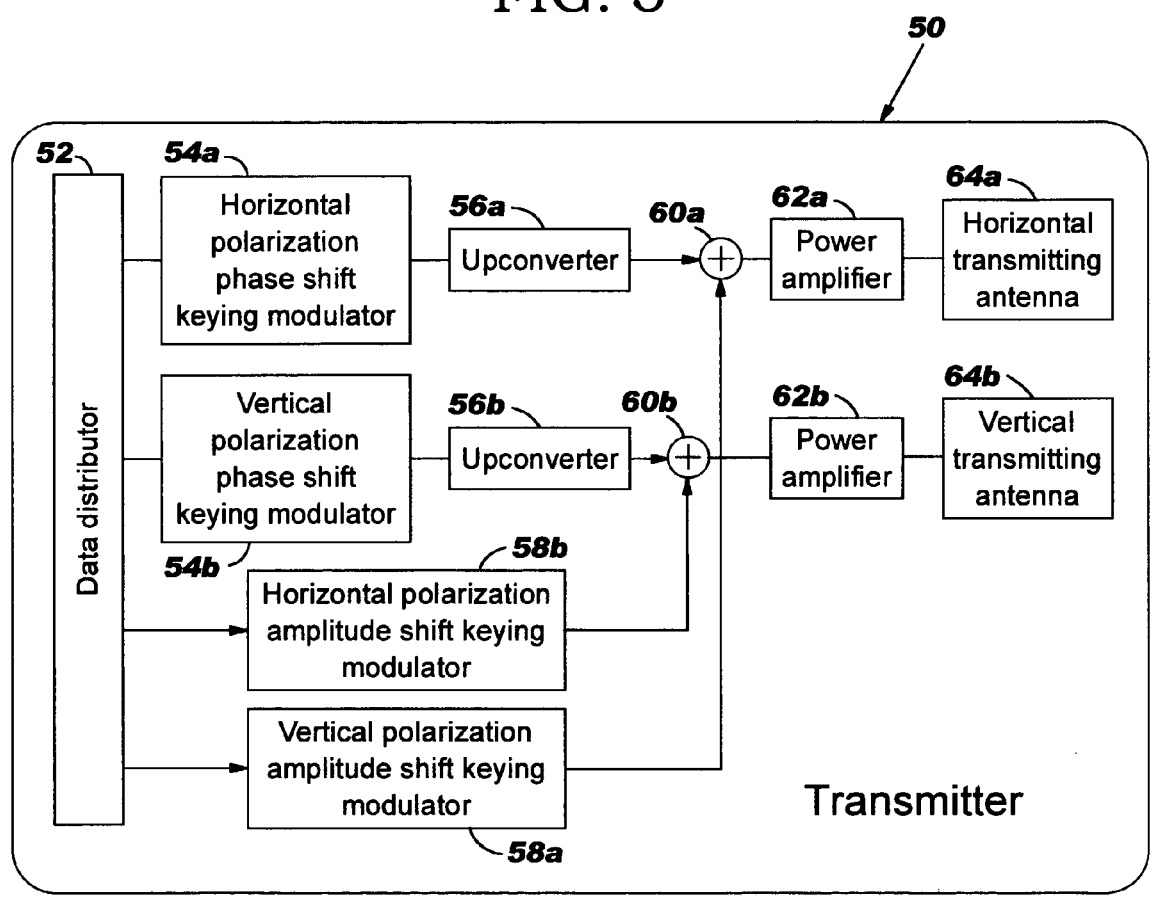
FIG. 3 is a block diagram showing a method of transmission in a transmitter used in the communication method of the present invention.

A transmitter suitable for use in the communication method of the present invention will first be described with reference to the block diagram of FIG. 3. A transmitter 50 includes a data distributor 52 which distributes digital data to be transmitted, phase and amplitude shift keying modulators 54a, 54b, 58a, and 58b which perform phase shift keying and amplitude shift keying on distributed polarized waves, up-converters 56a and 56b which perform processing including amplification on the polarized waves on which phase shift keying has been performed, adders 60a and 60b each of which adds together the polarized waves on which phase shift keying and amplitude shift keying have been performed, and horizontally and vertically polarized transmitting antennas 64a and 64b which transmit the polarized waves added together and power amplified.

The data distributor 52 may be included in the above-described code data assigner, and the horizontally and vertically polarized transmitting antennas 64a and 64b may be combined so as to have a common physical structure.

Figure 4A:
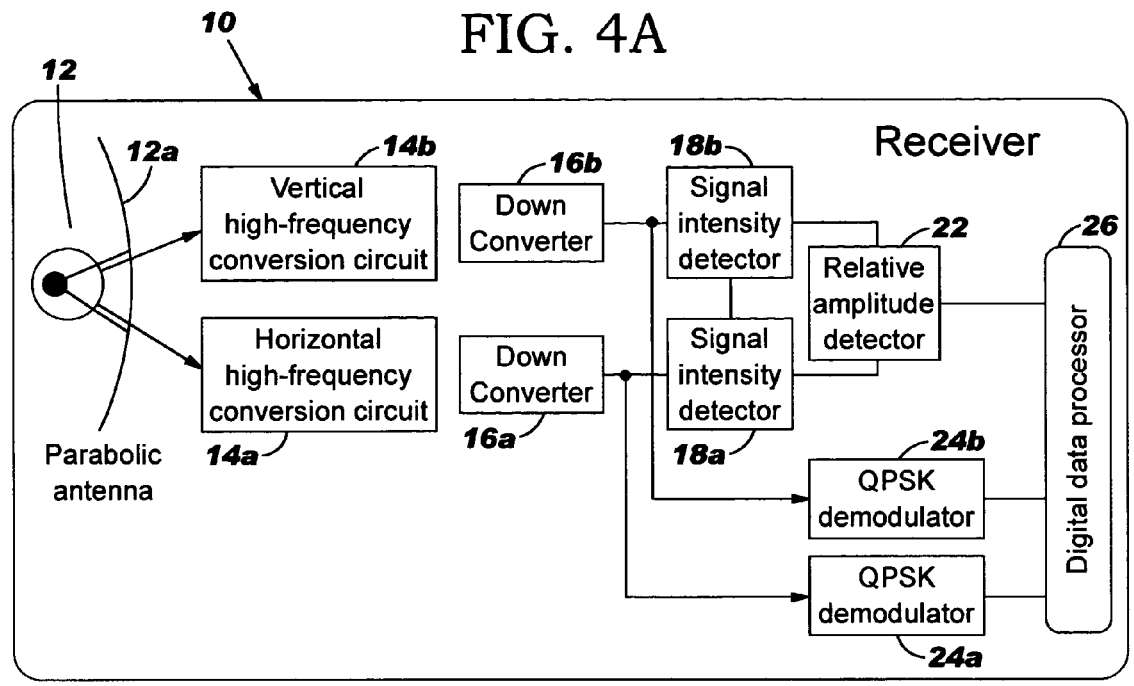
FIG. 4A is a block diagram showing the method of receiving in a receiver used in a communication method of the present invention.

Horizontally and vertically polarized waves transmitted from the transmitter 50 are received by a receiver 10 shown in the block diagram of FIG. 4A. The receiver 10 may include a parabolic antenna 12 which receives the polarized waves, horizontal and vertical high-frequency conversion circuits 14a and 14b which respectively detect the horizontally and vertically polarized waves, signal intensity detectors 18a and 18b which detect the amplitude intensities of the polarized waves detected and received through down-converters 16a and 16b, QPSK demodulators 24a and 24b which perform quadrature phase shift keying demodulation of the received polarized waves, a relative amplitude detector 22 which performs amplitude shift keying demodulation of the polarized waves received from the signal intensity detectors 18a and 18b, and a digital data processor 26 which combines data obtained from the demodulated polarized waves to reproduce transmitted data.

Any suitable method may be used to separate the signals carried on the horizontally and vertically polarized waves from the parabolic antenna 12 and supply the signals to the high-frequency conversion circuit 14. Although the horizontally and vertically polarized waves may be attenuated by propagation path disturbances, the independence of the two polarized waves and the difference between the amounts of attenuation in the polarized wave planes are normally maintained.

Electric waves collected by the parabolic reflecting plate 12A of the antenna 12 are guided to a horn portion of a low-noise block converter (LNB). At the end of the horn portion, the horizontally and vertically polarized waves are separated by the two high-frequency conversion circuits 14a and 14b, and are supplied to the down-converters 16a and 16b by the LNB circuit.

Alternatively, separate parabolic antennas specially provided for the horizontally and vertically polarized waves may themselves separate the horizontally and vertically polarized waves. Any other method for separating the horizontally and vertically polarized waves may be used, and the antenna is not limited to any particular type.

Figure 5:
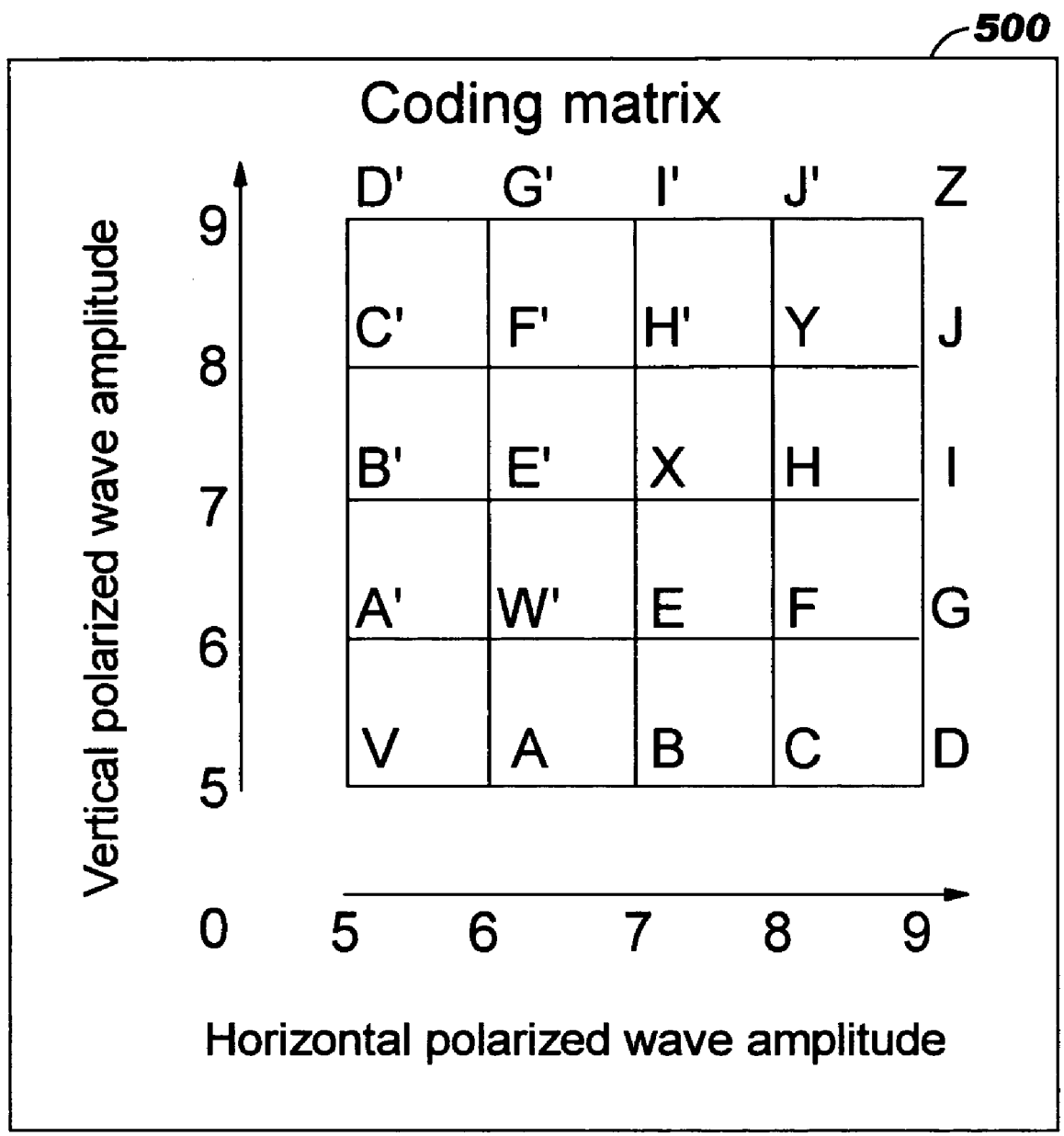
FIG. 5 shows a coding matrix for amplitude values obtained in an amplitude shift keying scheme in an embodiment of the present invention.

It is assumed here for descriptive convenience that amplitude shift keying used in this embodiment is performed in the transmitter 50 so that each polarized wave has five values, and that each polarized wave can be expressed by an integer value (5, 6, 7, 8, and 9) after being amplified. These amplitude values correspond, respectively, to data to be transmitted (000, 001, 010, 011, 100). A coding matrix 500 such as shown in FIG. 5 is obtained by plotting the amplified amplitude (5, 6, 7, 8 and 9) of the horizontally polarized wave along the abscissa and the amplified amplitude of the vertically polarized wave along the ordinate. By the coding matrix, data of 5×5=25 values to be transmitted are coded as shown in FIG. 5 by means of the set of amplified amplitude intensities of the polarized waves.

Conventional phase shift keying may be used to modulate each polarized wave. If each polarized wave has, for example, four values as a result of phase shift keying performed in addition to the above-described amplitude shift keying, 4×4×5×5=400 data points can be coded with respect to a particular frequency band.

The method of amplitude shift keying demodulation of the horizontally and vertically polarized waves in the relative amplitude detector 22 in this embodiment will now be described in detail.

Figure 4B:
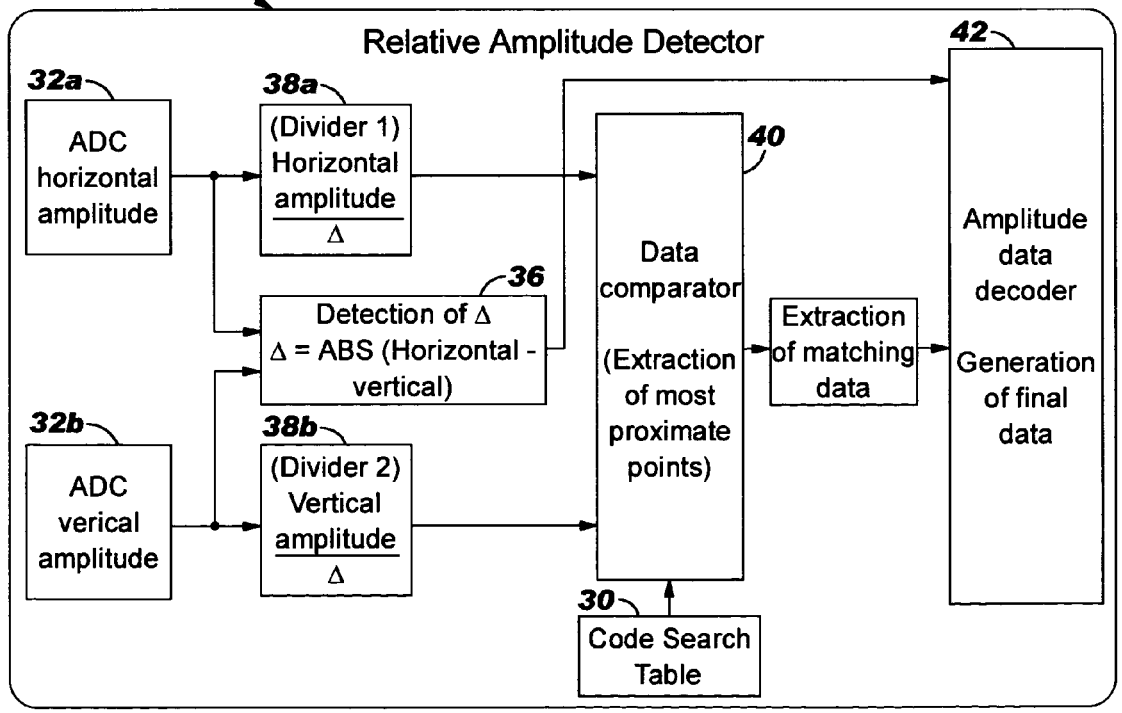
FIG. 4B is a block diagram showing a method of data processing in a relative amplitude detector 22 shown in FIG. 4A.

The block diagram of FIG. 4B shows the relative amplitude detector 22 in this embodiment. The relative amplitude detector 22 may include analog-to-digital converters 32a and 32b which convert amplitude analog data in the polarized waves sent from the signal intensity detectors 18a and 18b, an amplitude difference detector 36 which detects an amplitude difference D from the digital data on the amplitudes of the polarized waves, and dividers 38a and 38b which obtain relative values of the amplitude intensities of the polarized waves from the digital data on the amplitudes of the polarized waves and the amplitude intensity difference D detected by the amplitude difference detector 36.

The relative amplitude detector 22 may also include a data comparator 40 which compares the amplitude intensity relative values received from the dividers 38a and 38b with a code search table 30 to detect the most proximate points, and an amplitude data decoder 42 which receives data at the most proximate point and/or the amplitude intensity difference D=0 signal generated from the amplitude difference detector 36, and generates final data.

The data comparator 40 or the amplitude data decoder 42 may be included in the above-described decoding section or reproduction section.

The amplitude difference detector 36 subtracts the amplitude intensity of the vertically polarized wave from the amplitude intensity of the horizontally polarized wave, and detects the absolute value of the difference between the amplitude intensities of the two polarized waves. This amplitude intensity difference D has different positive values depending on the modulating signal applied to the amplitude, and is zero when the amplitudes of the two polarized waves are equal. When the amplitude intensity difference D is not zero, the ratio of the absolute values of the amplitudes of the two polarized waves and the amplitude intensity difference D are obtained to generate the relative values of the two amplitude intensities.

The amplitude intensity difference D and the amplitude intensity relative values will now be described further. When D is zero, the signal detected by the amplitude difference detector 36 is sent directly to the amplitude data decoder 42 in the relative amplitude detector 22. Otherwise (i.e., D is not zero), the amplitude intensity difference D detected by the amplitude difference detector 36 is sent to the dividers 38a and 38b for computation of relative value coordinates (horizontal amplitude intensity/D, vertical amplitude intensity/D). The relative value coordinates computed from the amplitude of the received carrier by the dividers 38a and 38b will be referred to as "received relative value coordinates." The relative value coordinates are differentiated from relative value coordinates coded in the code search table 30 described below.

Because the quantity obtained by dividing the amplitude intensity by the amplitude intensity difference D remains constant even when the amplitude intensity changes, the influence of amplitude attenuation on the received relative coordinate values due to propagation path disturbances can be avoided.

Figure 2:
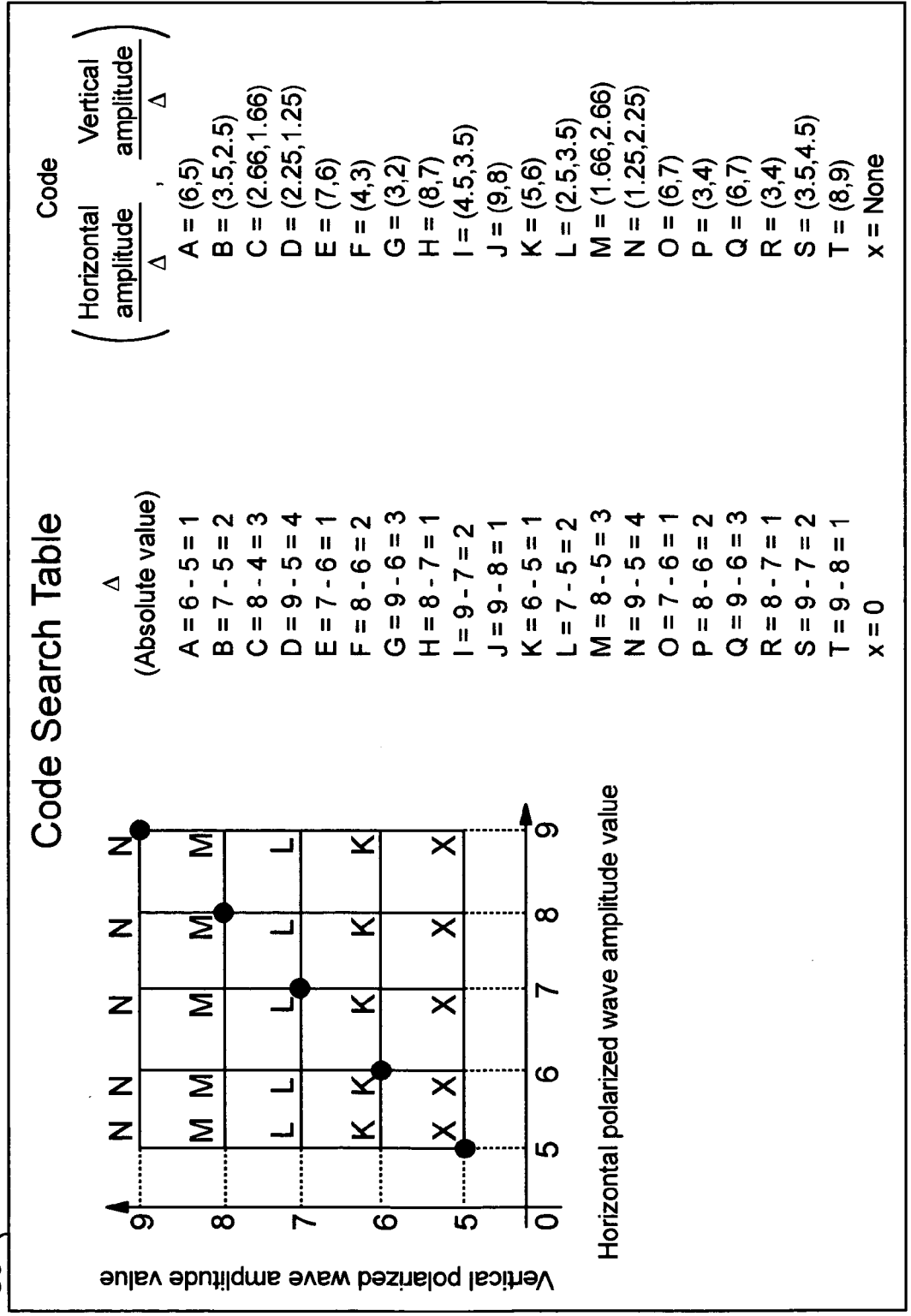
FIG. 2 shows a relative-coordinates coding matrix obtained in an amplitude shift keying scheme in an embodiment of the present invention.

FIG. 2 shows the code search table 30. The relative value coordinates are different from each other except for those on a diagonal line, and are coded as shown in FIG. 2. The coordinates on the diagonal lines are not discriminated from each other. These are given a code X, because D is zero. In this embodiment, the amplitude intensity after amplitude shift keying is an integer in the range 5 to 9. Consequently, the relative amplitude detector 22 is capable of coding into A to T and X, and thus supports the twenty-one encodings shown in FIG. 2.

The code search table 30 may be stored in advance in a storage device provided outside or inside the relative amplitude detector 22, for reference at the time of demodulation.

Data on the above-described received relative value coordinates computed by the dividers 38a and 38b is sent to the data comparator 40 to be coded. The data comparator 40 first compares the received relative value coordinates with coded relative value coordinate data in the code search table 30. Since the amplitude signal of the carrier may be changed by propagation path disturbances in wireless communication as described above, the data comparator 40 detects the relative value coordinate data closest to the received relative value coordinates from the code search table 30. The relative value coordinate data to be detected is relative value coordinate data coded into the twenty items A to T shown in FIG. 2.

The closest relative value coordinate data thus detected is sent to the amplitude data decoder 42. The amplitude data decoder 42 extracts the corresponding codes from A to T in the code search table 30. When the amplitude intensity difference D=0 signal comes from the amplitude difference detector 36, the amplitude data decoder 42 determines that the amplitude intensity difference is zero, and gives code X. The extracted amplitude shift keying codes are sent to the digital data processor 26 and combined with codes obtained by QPSK demodulation, thus decoding to obtain the transmitted data.

Figure 1:
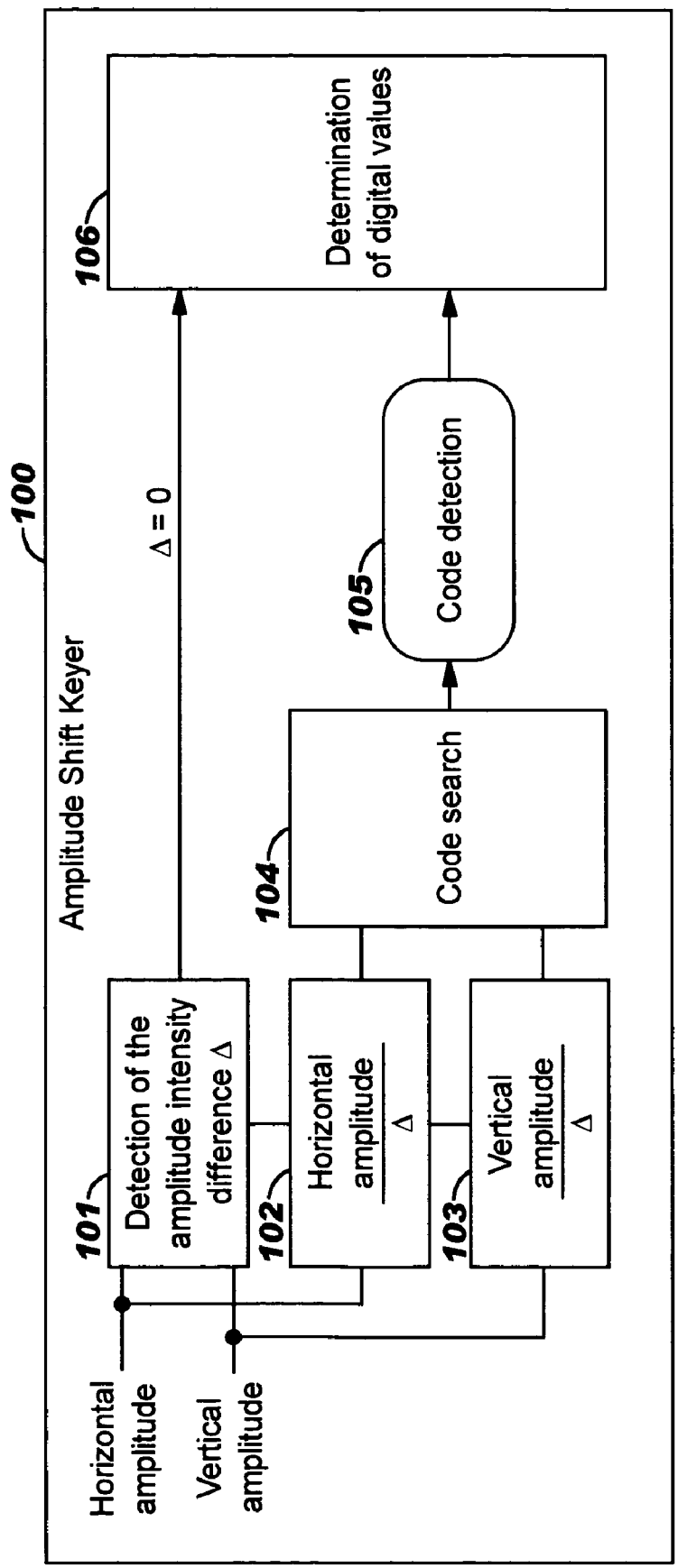
FIG. 1 is a block diagram outlining amplitude shift keying in a communication method of the present invention.

FIG. 1 is a block diagram showing an amplitude shift keyer 100 that is suitable for use in the communication method of the present invention. The exemplary amplitude shift keyer 100 includes blocks for detecting the amplitude intensity difference 101, dividing the amplitude of the horizontally polarized signal by the detected difference 102, dividing the amplitude of the vertically polarized signal by the detected difference 103, performing code search 104 and code detection 105, and determining the appropriate digital value 106. The communication method of the present invention is not, however, so limited. For example, more or less than five amplitude levels may be used, as well as five. Also, the invention is not limited to the use of the exemplary phase-shift keying modulation scheme that is discussed here in combination with amplitude shift keying. The scope of the communication method of the present invention includes as well any other amplitude shift keying modulation and demodulation methods for standardizing and coding the amplitude intensity by using the amplitude intensity difference D.

The communication apparatus of the present invention is not limited to the configuration of the above-described embodiment. The components corresponding to the relative amplitude detector that detects relative values of the amplitude intensity, the decoding section that decodes to obtain codes corresponding to the relative values by referring to the code search table, and the reproduction section that reproduces transmitted data from the codes may be included in any forms in the communication apparatus of the present invention.

Also, any suitable method may be used to separate the horizontally and vertically polarized waves, and the transmitting and receiving antenna is not limited to any particular type. It is not a requirement of the invention that the two polarized waves be orthogonal to each other. Further, the two polarized waves may be circularly polarized waves such as right-hand and left-hand circularly polarized waves. Any two polarized waves may suffice if they can carry data independently of each other.

Wireless communication in the context of the present invention may be preferably performed by setting sharp directivity at high frequencies. However, the communication method of the present invention is not limited to wireless communication in a particular frequency band.

According to the communication method of the present invention, two polarized waves that are independent of each other are used. Amplitude shift keying and phase shift keying may be performed on each polarized wave, thereby enabling high data throughput in wireless communication.

In particular, since the quantity obtained by dividing the amplitude intensity of each of the two polarized waves by the amplitude intensity difference D is constant even when the amplitude intensity changes, the influence of amplitude attenuation due to propagation path disturbances on the received relative value coordinates can be avoided. That is, since modulation and demodulation are performed by using the relative values of the amplitude intensities in the communication method of the present invention, the communication method of the present invention is capable of avoiding the influence of propagation path disturbances, in contrast to the conventional modulation scheme using the absolute value of the amplitude intensity.

Thus, the communication method of the present invention ensures wireless communication with improved stability against propagation path disturbances, and thereby enables high data throughput with accuracy.

We claim:

1. A communication method, comprising the steps of:
    generating, in correspondence with data to be transmitted, codes based on relative values of amplitude intensities of a first wave with a first polarization and a second wave with a second polarization, wherein the first and second polarizations are different;
    modulating the first and second polarized waves according to the codes;
    transmitting the first and second polarized waves;
    receiving the transmitted first and second polarized waves;
    detecting relative amplitude intensities of the first and second polarized waves;
    decoding the detected relative amplitude intensities to obtain the codes; and
    reproducing the transmitted data from the obtained codes.

2. The communication method according to claim 1, wherein the codes are determined based on relative values which are ratios of the amplitude intensities of the first and second polarized waves to a difference between the amplitude intensities of the first and second polarized waves.

3. The communication method according to claim 2, wherein said modulating step includes a step of performing phase shift keying on the first and second polarized waves before transmitting the first and second polarized waves.

4. The communication method according, to claim 2, wherein the first polarized wave and the second polarized wave are orthogonal.

5. Communication apparatus, comprising:
    a transmitter which transmits a first wave having a first polarization and a second wave having a second polarization wherein the first polarization and the second polarization are different;
    a code data assigner which assigns codes corresponding to data to be transmitted, based on relative values of amplitude intensifies of the first and second polarized waves; and
    a modulator which modulates the first and second polarized waves according to amplitudes corresponding to the codes assigned by said code data assigner.

6. Communication apparatus comprising:
    a receiver which receives a first polarized wave and a second polarized wave, where the polarization of the first wave differs from the polarization of the second wave;
    a relative amplitude detector which detects relative values of amplitude intensities of the first and second polarized waves received by said receiver;
    a decoding section which decodes to obtain codes from the relative values detected by said relative amplitude detector; and
    a reproduction section which reproduces transmitted data from the codes obtained by decoding performed by said decoding section.

7. A communication system for communicating data from source apparatus to destination apparatus,
    wherein the source apparatus comprises a transmitter which transmits a first wave having a first polarization and a second wave a second polarization, wherein the first polarization and the second polarization are different, a code data assigner which assigns codes corresponding to data to be transmitted and related to relative values of amplitudes intensities of the first and second polarized waves; and a modulator which modulates the first and second polarized waves according to amplitudes corresponding to the codes assigned by said code data assigner, and
    further wherein the destination apparatus composes a receiver which receives a first polarized wave and a second polarized wave, where the polarization of the first wave differs from the polarization of the second wave; a relative amplitude detector which detects relative values of amplitude intensities of the first and second polarized waves received by said receiver, a decoding section which decodes to obtain codes from the relative values detected by said relative amplitude detector; and a reproduction section which reproduces transmitted data from the codes obtained by decoding performed by said decoding section.

* * * * *